(12) United States Patent
Friar et al.

(10) Patent No.: US 6,746,091 B2
(45) Date of Patent: Jun. 8, 2004

(54) CART LOCKING DEVICE

(75) Inventors: Timothy A. Friar, Sunbury, OH (US); Paul E. Hsu, Hilliard, OH (US); Jay F. Perkins, Pickerington, OH (US); Robert H. Roth, Cincinnati, OH (US)

(73) Assignee: Artromick International, Inc., DE (US)

( * ) Notice: Subject to any disclaimer, the term of this patent is extended or adjusted under 35 U.S.C. 154(b) by 68 days.

(21) Appl. No.: 10/001,828

(22) Filed: Dec. 5, 2001

(65) Prior Publication Data

US 2003/0102784 A1 Jun. 5, 2003

(51) Int. Cl.[7] .............................................. E05B 53/00
(52) U.S. Cl. .................................... 312/218; 312/319.5
(58) Field of Search ................................ 312/217, 218, 312/219, 221, 216, 222, 319.5, 319.8, 319.6, 319.7; 70/78, 81, 85, 86, 277, 279.1, 283; 292/144

(56) References Cited

U.S. PATENT DOCUMENTS

| | | | |
|---|---|---|---|
| 1,265,054 A | * 5/1918 | Clauson | 312/215 |
| 4,341,155 A | 7/1982 | Relyea et al. | 101/125 |
| 4,813,753 A | 3/1989 | Relyea | 312/291 |
| 4,822,116 A | 4/1989 | Relyea et al. | 312/209 |
| 4,958,891 A | 9/1990 | Taylor et al. | 312/287 |
| 5,139,321 A | 8/1992 | Beardsley | 312/209 |
| 5,172,967 A | * 12/1992 | Pipe | 312/217 |
| 5,211,461 A | 5/1993 | Teufel et al. | 312/334.4 |
| 5,225,825 A | * 7/1993 | Warren | 340/5.22 |
| 5,251,757 A | 10/1993 | Relyea et al. | 206/531 |
| 5,259,668 A | 11/1993 | Teufel et al. | 312/249.11 |
| 5,282,678 A | 2/1994 | Teufel et al. | 312/221 |
| 5,322,365 A | 6/1994 | Teufel et al. | 312/330.1 |
| 5,377,839 A | 1/1995 | Relyea et al. | 206/531 |
| 5,385,039 A | * 1/1995 | Feldpausch et al. | 70/78 |
| 5,743,607 A | 4/1998 | Teufel et al. | 312/265.2 |
| 5,803,559 A | * 9/1998 | Carlson et al. | 312/265.1 |
| 5,820,234 A | * 10/1998 | Capwell et al. | 312/216 |
| 5,841,361 A | * 11/1998 | Hoffman | 340/5.54 |
| 5,845,524 A | * 12/1998 | Koehler | 70/278.7 |
| 6,082,544 A | 7/2000 | Romick | 206/531 |
| 6,116,067 A | * 9/2000 | Myers et al. | 70/279.1 |
| 6,130,621 A | * 10/2000 | Weiss | 340/5.28 |
| 6,374,649 B1 | * 4/2002 | Holcomb et al. | 70/78 |

FOREIGN PATENT DOCUMENTS

GB          2220026 A  * 12/1989 ........... E05B/65/46

* cited by examiner

Primary Examiner—Lanna Mai
Assistant Examiner—John Fitzgerald
(74) Attorney, Agent, or Firm—Wood, Herron & Evans, LLP

(57) ABSTRACT

A keyless locking system for a cart includes a lock mechanism with a drive mechanism in the form of a solenoid that is electrically coupled to an integrated circuit and a long lasting power supply. In an unenergized state, an armature of the solenoid prevents operation of the lock mechanism to release drawers supported by the cart. Upon entry of a correct access code via a keypad associated with the integrated circuit, current is supplied to the solenoid to permit operation of the lock mechanism and thereby release the drawers. Advantageously, the lock mechanism only draws from the power supply to temporarily release the solenoid only thereby requiring minimal power and significantly reducing the re-charging, replacement and maintenance requirements for the power supply and the down time for the cart.

27 Claims, 9 Drawing Sheets

CART LOCKING DEVICE

FIELD OF THE INVENTION

This invention pertains to carts with lockable drawers and more particularly to a keyless locking system for medical carts.

BACKGROUND OF THE INVENTION

Carts with lockable drawers are used for many applications. For example, a medical cart is used to administer medication to patients in hospitals or other care facilities. A typical medical cart has casters located at the bottom of the cart to permit easy movement of the cart by attending nurses to various patients' rooms. The cart also has one or more drawers for storing patients' medicines. Typically, each drawer is dedicated to storing the medication for an individual patient. Because the cart is used to store medications for several patients and is moveable from room to room, controlling access to the contents of the cart to prevent theft or misuse of medication and thereby protect the patients is important. One such medical cart, as described above, is disclosed in U.S. Pat. No. 5,743,607, to Teufel et al., which patent is commonly held by the assignee of the present invention and hereby incorporated by reference in its entirety.

Controlling access to medical carts in the past involved the use of manual key locks or complex electromechanical devices which permit a drawer locking tab to lock and unlock all of the drawers of the medical cart. U.S. Pat. No. 5,743,607, for example, discloses the use of a keypad with a system of locking tabs to lock the drawers of a cart. These prior art methods of locking carts or controlling access to medical carts, while being effective, do have certain limitations. For example, the keys for a manually locked cart can be lost or misappropriated by unauthorized persons. In the event that a key is lost and controlled access to the cart has been compromised, the changing of a keyed lock requires considerable time and expense during which time the cart cannot be used. In the case of electromechanical locks, prior art locking systems generally consume a considerable amount of power, requiring the systems to be charged daily for proper operation of the electromechanical locking mechanism. Furthermore, service, maintenance, and manufacture of prior art carts may be generally expensive and time consuming due to the complexity of the locking mechanisms.

Accordingly, there is a need for a simple, keyless cart locking system having low power consumption requirements and which is easy to manufacture and maintain, particularly for medical carts having lockable drawers.

SUMMARY OF THE INVENTION

This invention, in one embodiment, is a locking system for a cart with lockable drawers, such as a medical cart, and in another embodiment the invention is a cart with such a locking system. The locking system includes an integrated circuit which controls the actuation of a drive mechanism in the form of a solenoid to permit the operation by a user of a handle for release of the drawers. Advantageously, power to the solenoid is only provided to disengage the lock mechanism when a correct access code has been entered via a keypad or other user input device. Previously, locking mechanisms for carts of this type required a significant amount of power for actuation of the drive and lock mechanisms. Since this invention only briefly consumes power to disengage the drive mechanism, the system has very low power consumption requirements. The simple design of the locking mechanism also makes it easy to operate, manufacture and service.

The invention includes a lock mechanism having a handle which is manipulated by a user to disengage a locking tab of the medical cart. The lock mechanism includes a housing which supports the handle and a spring-loaded cam to disengage the locking tab. The lock mechanism further includes a drive mechanism in the form of a solenoid having a movable armature that positively engages the handle portion of the lock mechanism to prevent the lock mechanism from disengaging the locking tab when the solenoid is in an unenergized, or "no load" state. The solenoid is connected to an integrated circuit having a keypad to accept user input such as an access code, and also to a power supply which provides power to the solenoid when the correct access code has been entered into the keypad. In a preferred embodiment, the power supply includes four D cell batteries to energize the solenoid on demand when the cart is to be unlocked.

The locking system of this invention preferably includes a manual override device to gain access to the drawers of the cart in the event of a loss of power or in the event the access code has been lost. The manual override device includes a flexible yoke which is connected to the armature of the solenoid. The yoke is actuated to disengage the armature from the handle by a conventional key lock coupled to and remotely located from the lock mechanism. In a preferred embodiment, the yoke is coupled to the remote key lock by a cable.

In another aspect of the invention, the housing of the lock mechanism has a clam-shell design, with hinges that facilitate easy assembly. The lock mechanism also includes a rod and handle assembly for an operator to disengage the drawer locking tabs of the cart. In this regard, the rod has a cam at one end which protrudes from the housing to move the locking tabs from a locked configuration to an unlocked configuration. The handle is inserted into an end of the housing opposite from the cam and is coupled to the rod.

BRIEF DESCRIPTION OF THE DRAWINGS

The accompanying drawings, which are incorporated in and constitute a part of this specification, illustrate presently preferred embodiments of the invention and, together with a general description of the invention given above, and the detailed description given below, serve to explain the invention.

DETAILED DESCRIPTION

Figure 1:
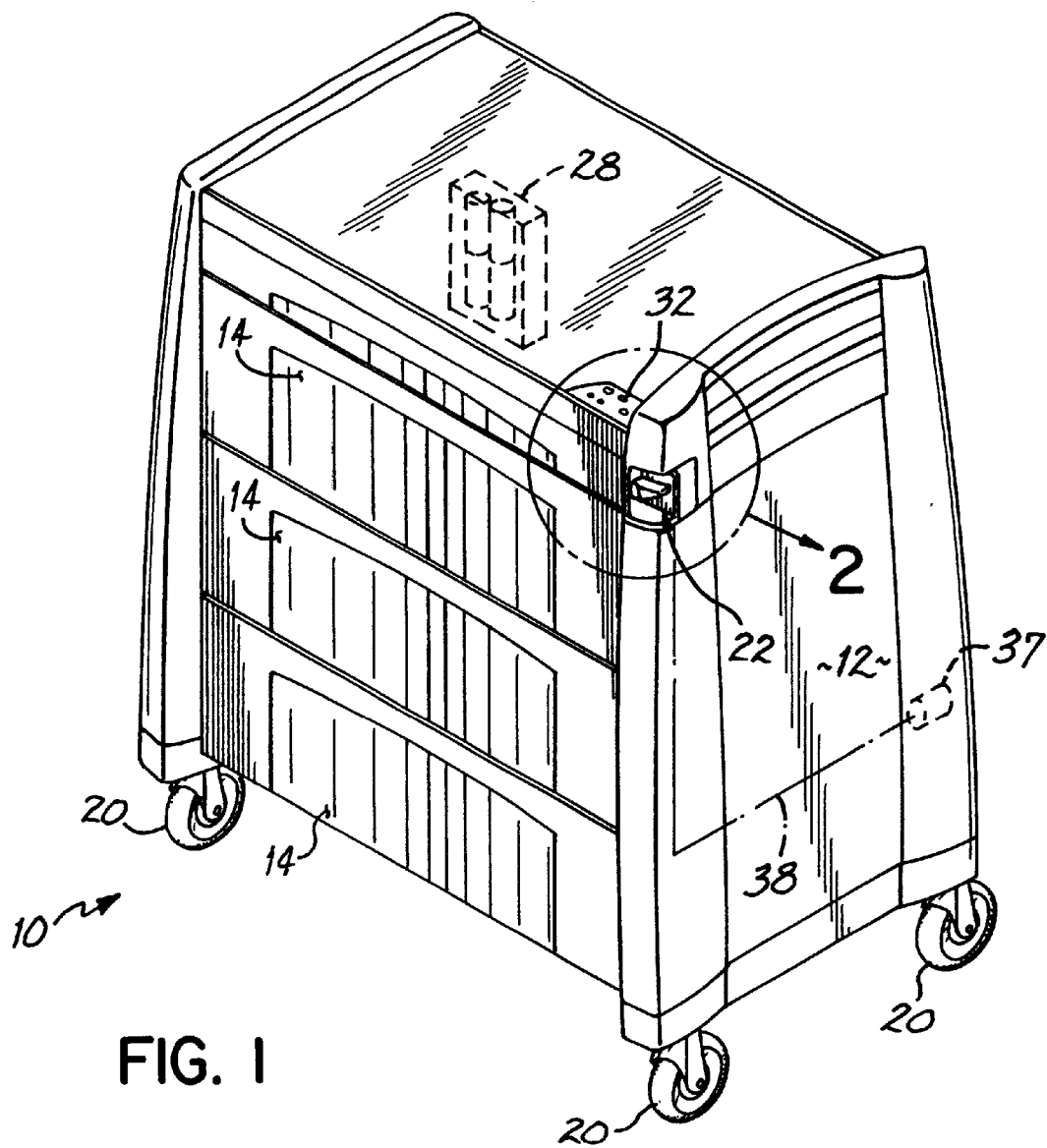
FIG. 1 is a perspective view of a medical cart including a locking system that incorporates features of the present invention.
Figure 2:
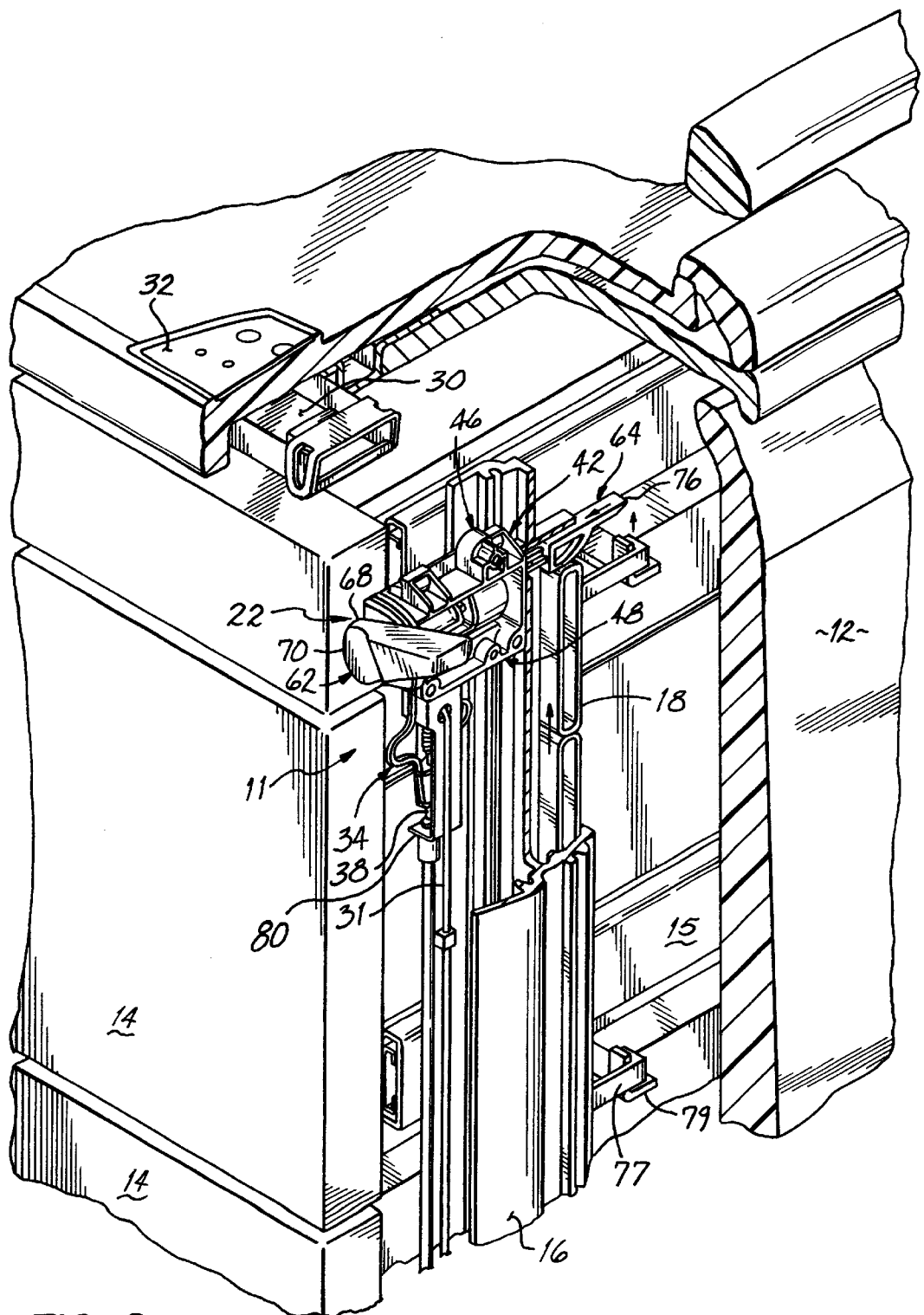
FIG. 2 is a partially broken perspective view showing detail of the locking system and cart of the encircled area 2 of FIG. 1.

Referring to FIGS. 1–2, a medical cart 10 is shown including a locking system 11 incorporating features of the present invention. The cart 10 has an enclosure 12 which houses a number of drawers 14, mounted on slides 15, and a frame structure 16 including a drawer locking tab 18 which can be used to lock all of the drawers 14 in a closed position. The drawers 14 may be used to store medicine for individual patients and the cart 10 is provided with casters 20 to enable the cart 10 to be easily moved within a facility so that the cart 10 may be taken to individual patient rooms for administration of medicine.

Figure 3:
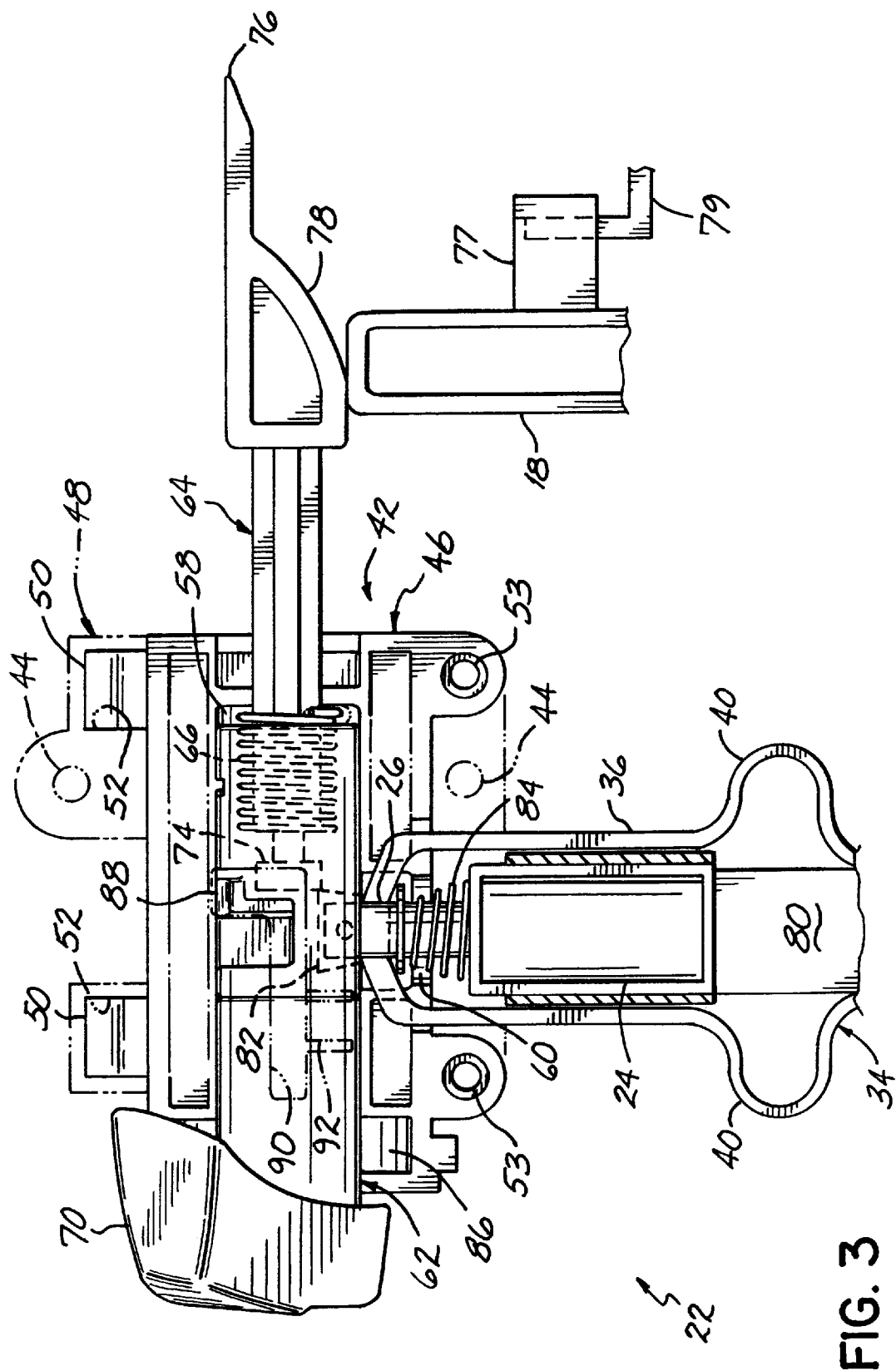
FIG. 3 is a side elevational view of the lock mechanism of FIG. 2 with the outer housing shown in phantom.

As shown in FIGS. 2 and 3, the locking system 11 of the present invention includes a lock mechanism 22 which is selectively urged into contact with the drawer locking tab 18 of the cart 10, to thereby secure or release the drawers 14 of the cart 10. The locking system 11 includes a drive mechanism which is preferably a solenoid 24 having an armature 26 which is engageable with the lock mechanism 22 for operation from a locked configuration to an unlocked configuration, as will be described in further detail. While the solenoid is preferable, the drive mechanism 24 may alternatively be a motor, magnet or another mechanism known in the art.

The locking system 11 further includes a power supply 28 (shown in dashed lines in FIG. 1) and an integrated circuit 30 electrically coupled to the solenoid 24 by wires 31. The integrated circuit 30 is coupled to a keypad 32 located within the enclosure 12 by which an operator may enter an access code to the integrated circuit 30. If the access code corresponds to a stored code value, the integrated circuit 30 controls the flow of current to the solenoid 24 to disengage the armature 26 from the lock mechanism 22 and permit operation from the locked configuration to the unlocked configuration.

In one embodiment of this invention, the keyless locking system 11 further includes a manual override device 34 which is utilized in the event of a power failure, or alternatively in the event that the access code has been lost. The manual override device 34 has a yoke 36 which is coupled to the armature 26 of the solenoid 24 whereby the yoke 36 can be manually actuated to disengage the armature 26 from the lock mechanism 22. In one embodiment, the yoke 36 is coupled to a conventional key-operated lock 37 (see FIG. 1) which is remotely located from the lock mechanism. The key-operated lock 37 is connected to the yoke 36 by a flexible cable 38, having a return spring 39 (see FIG. 4), such that it can be manipulated using a key (not shown) inserted into the lock 37. The yoke 36 is configured to accommodate tolerances between the yoke 36, the cable 38, and the armature 26 so that the manual override device 34 will operate efficiently. In the exemplary embodiment shown in FIGS. 3 and 6, the yoke 36 includes a pair of arcuate formations 40 which act as a living hinge to accommodate the tolerances.

Figure 4:
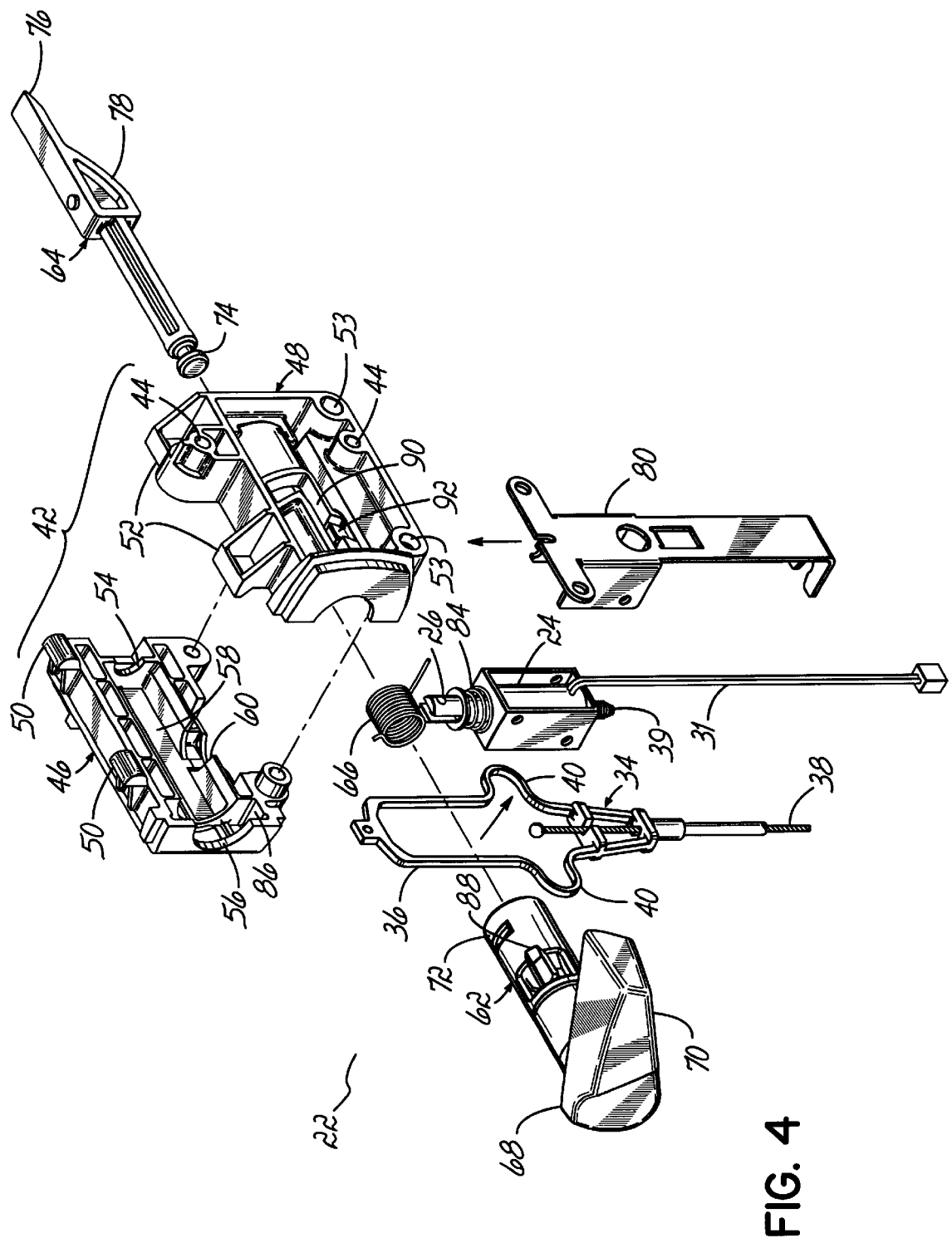
FIG. 4 is an exploded view of the lock mechanism of FIG. 3.

Referring to FIGS. 3 and 4, the lock mechanism 22 of one embodiment of this invention includes a housing 42 which is fastened to the frame 16 of the medical cart 10 using bolts or other fasteners (not shown) projecting through holes 44. The housing 42 includes two opposing halves 46, 48 having mating tabs 50 and slots 52 that fit together to form a hinge, whereby the housing 42 is assembled in a clamshell fashion and secured by fasteners (not shown) installed through holes 53. The housing 42 defines first and second opposing apertures 54, 56, and a central cavity 58 disposed between the apertures 54, 56. A third aperture 60 in the housing 42 intersects the central cavity 58 between the first and second apertures 54, 56. The lock mechanism 22 also includes a handle 62 and a rod 64 coupled together and slidably disposed within the central cavity 58 of the housing 42. A spring 66 is disposed between the rod 64 and the handle 62 to axially bias the rod 64 and handle 62 toward an unlocked configuration of the lock mechanism 22. The spring 66 also rotationally biases the rod 64 and handle 62 toward a locked configuration of the lock mechanism 22.

A first end 68 of the handle 62 has a knob 70 which extends from the second aperture 56 of the housing 42 so that the handle 62 may be manipulated by a user. A second end 72 of the handle 62 is rotatably coupled to a second end 74 of the rod 64. A first end 76 of the rod extends from the first aperture 54 of the housing 42, and has a cam surface 78 which operatively engages the locking tab 18 such that latches 77 on the locking tab 18 may capture or release tines 79 fixed to the drawers 14. Thus, the handle 62 may be rotatably and slidably manipulated by the knob 70 to move within the housing 42 to a first position, corresponding to a locked configuration in which the cam 78 engages the drawer locking tab 18 to capture tines 79 with latches 77 and thereby secure the drawers 14. FIG. 3 depicts the handle 62 in the first, locked position. The handle 62 may further be moved to a second position, corresponding to an unlocked configuration (FIG. 6), wherein the cam 78 disengages the drawer locking tab 18 to release tines 79 from latches 77 and thereby unlock the drawers 14.

Figure 5:
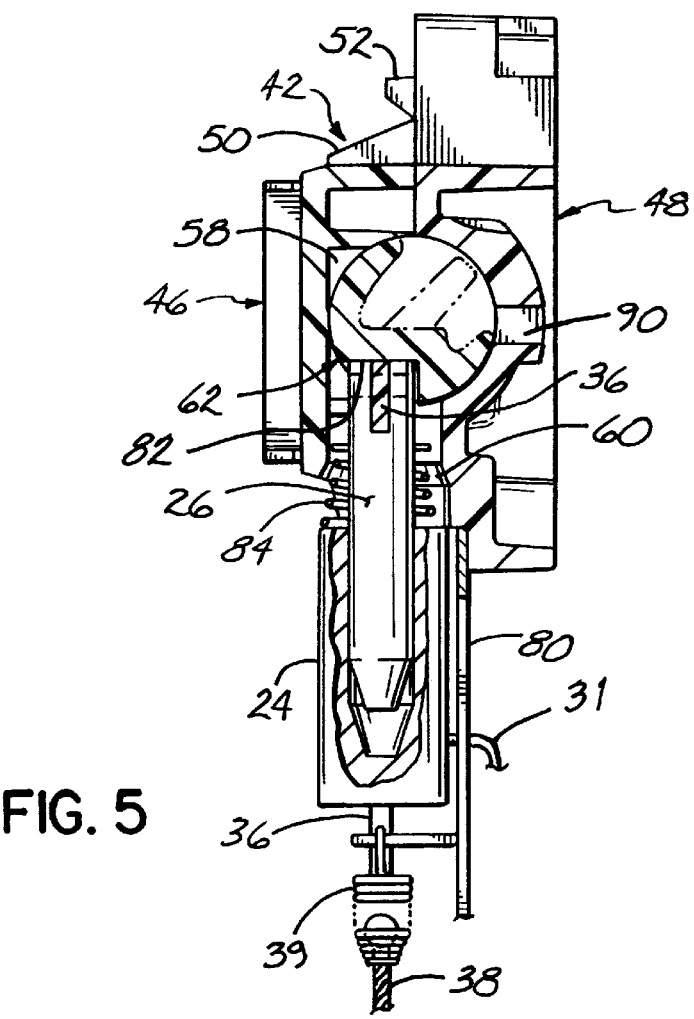
FIG. 5 is a view similar to FIG. 3 showing the handle in the first, locked, position.
Figure 6:
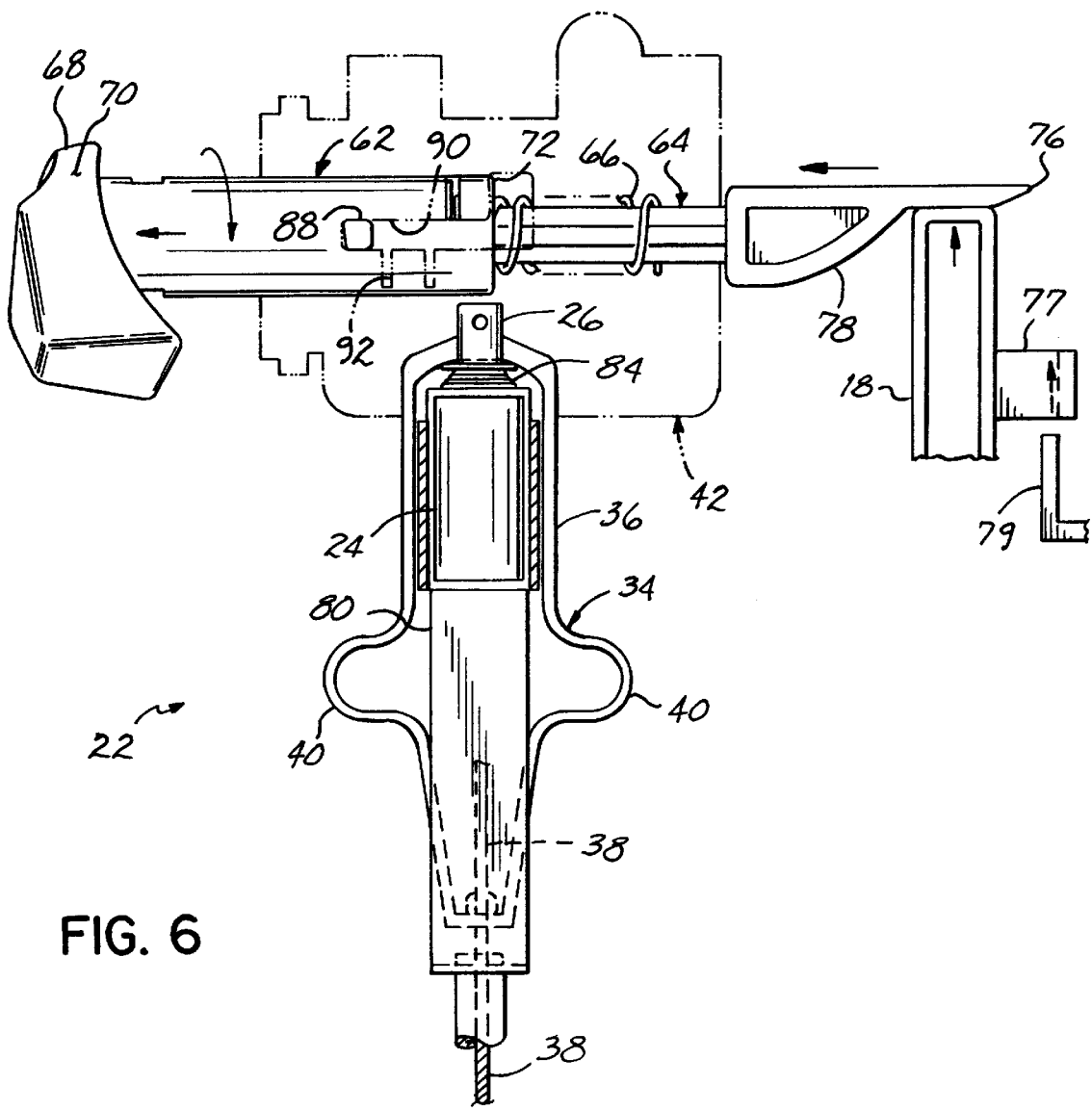
FIG. 6 is a view similar to FIG. 3 showing the handle in the second, unlocked, position.

Referring to FIGS. 3–6, the solenoid 24 is fixed to the housing 42 by a bracket 80. A recess 82 is formed into a portion of the handle 62 contained within the housing 42. When the handle 62 is in the first position, corresponding to a locked configuration, the armature 26 of the solenoid 24 is urged into positive contact with the recess 82 of the handle 62 through the third aperture 60 by a biasing spring 84 on the solenoid, as depicted in FIGS. 3 and 5. In this configuration, the armature 26 prevents manipulation of the handle 62 from the locked position. When the solenoid 24 has been energized, or the manual override mechanism 34 has been actuated, the armature 26 is retracted from the handle 62 so that the handle 62 may be freely rotated and slid within the housing 42 from the first position to the second or unlocked position (FIG. 6).

Figure 8:
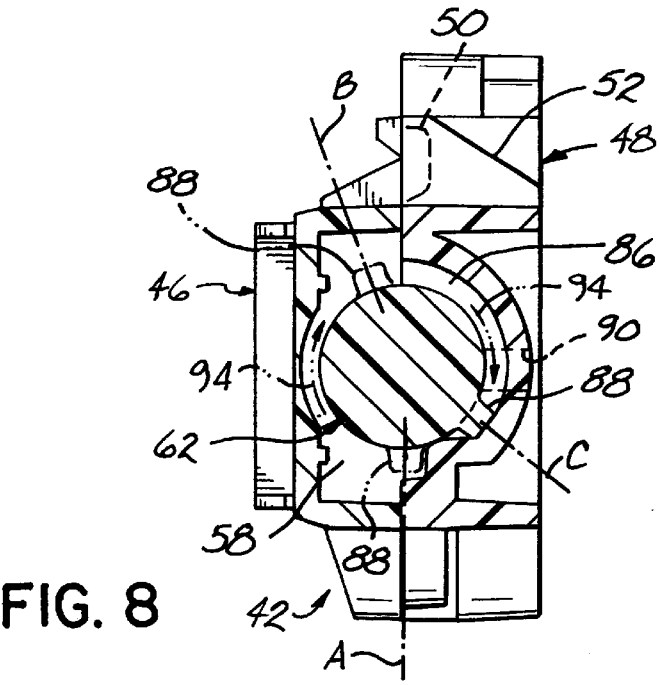
FIG. 8 is a section view of the lock mechanism of FIG. 7 taken along line 8—8.
Figure 7:
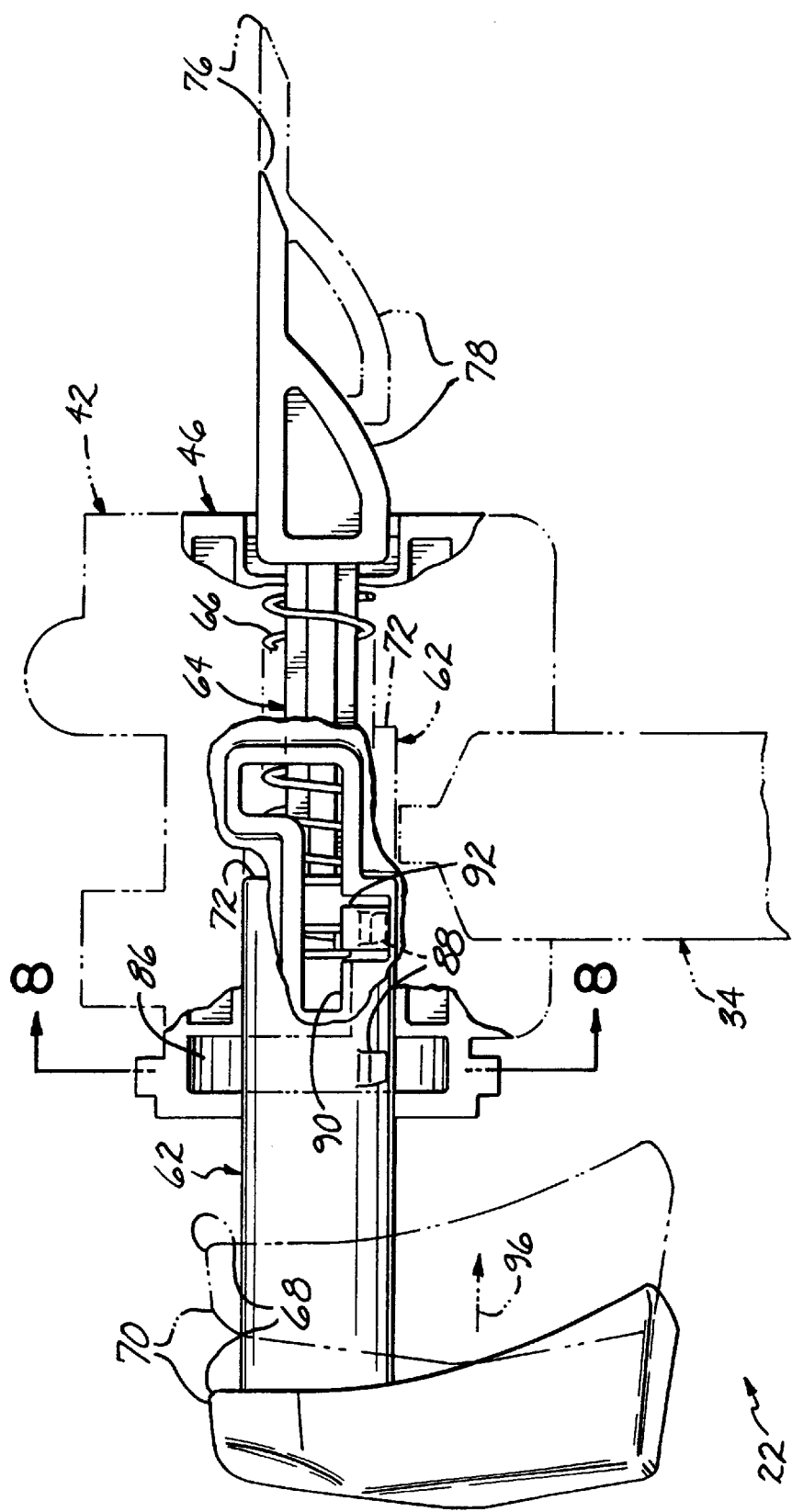
FIG. 7 is partial side view of the lock mechanism of FIG. 3, showing movement of the handle upon initial assembly.

In another exemplary embodiment, shown most clearly in FIGS. 4 and 8, the housing 42 of the lock mechanism has a groove 86 formed into the corresponding portions of the opposing housing pieces 46, 48. The groove 86 defines a channel proximate the second aperture 56 through which the handle 62 protrudes from the housing 42. A boss 88 on the handle 62 is seated within the groove 86 upon assembly of the lock mechanism 22. As shown in FIG. 7, the groove 86 is in communication with a slot 90 formed into one portion of the housing piece 48. The slot 90 captures the boss 88 on the handle 62 to constrain the translational and rotational movement of the handle 62 from the first position to the second position. A tab 92 between the groove 86 and the slot 90 acts as a one-way stop to permit the boss 88 to pass from the groove 86 to the slot 90 during initial assembly of the lock mechanism 22 and to prevent the boss 88 from moving back into the groove 86 once the lock mechanism 22 has been assembled. The groove 86 defines a path along which the handle 62 may be manipulated upon initial assembly to preload the spring 66 disposed between the rod 64 and the handle 62. The spring 66 biases the handle 62 axially toward the second position. In a preferred embodiment, the spring 66 is preloaded both torsionally and axially so that the handle 62 is biased rotationally toward the first, locked position and axially toward the second, unlocked position.

Figure 9:
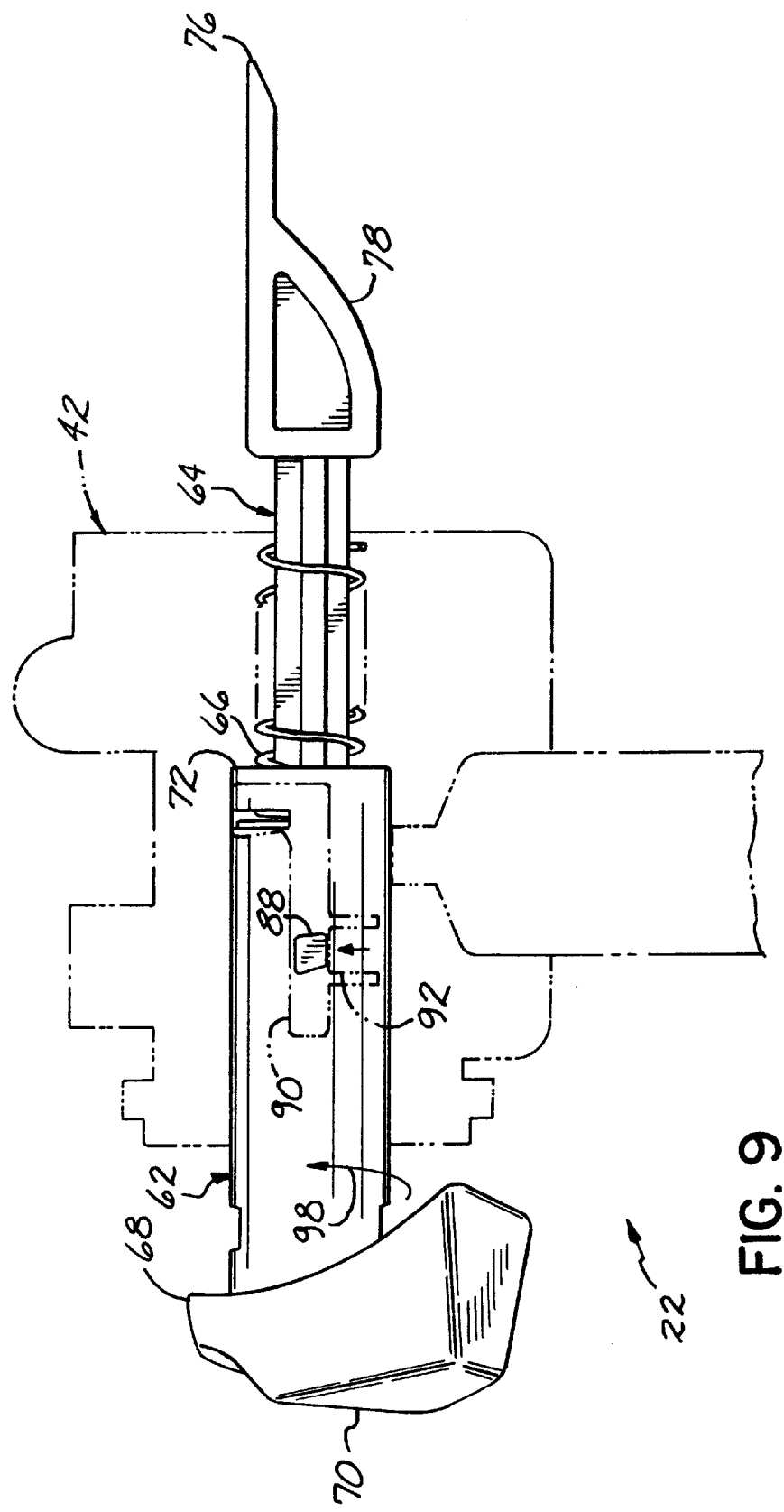
FIG. 9 is a partial side view of the lock mechanism of FIG. 7 showing further movement of the handle upon initial assembly.

With reference to FIGS. 7–9, the torsional and axial preload of spring 66 upon initial assembly of the lock mechanism 22 will be further explained. Referring to FIG. 8, handle 62 is initial installed into housing 42 with boss 88 resting in groove 86 in the orientation A. Spring 66 is torsionally preloaded by rotating the handle 62 in the direction of arrows 94, through orientation B to the stop at orientation C. At orientation C, handle 62 is urged axially toward tab 92 in the direction of arrow 96 as depicted by the phantom lines in FIG. 7. When the boss 88 engages tab 92, handle 62 is rotated in the direction of arrow 98 so that boss 88 enters slot 90, as depicted in FIG. 9. When boss 88 enters slot 90, tab 92 prevents boss 88 from reentering groove 86, such that boss 88 is constrained to move within slot 90. The extreme locations of boss 88 within slot 90 correspond to the first and second positions of handle 62, as depicted in FIGS. 3 and 6.

The integrated circuit 30 operatively coupled to the solenoid 24 by wires 31 acts as a switch to control the flow of current from the power source 28 to the solenoid 24. A keypad 32 associated with the integrated circuit 30 accepts an access code input by a user and compares the entered access code to a stored value. If the stored value does not correspond to the entered access code, the switch remains open and the integrated circuit 30 does not provide power to the solenoid 24. When a correct access code has been entered, the switch is closed to send current to the solenoid 24 for a specified time interval. During the specified time interval, the solenoid 24 is energized to move the armature 26 away from the recess 82 in the handle 62. The knob 70 then may be manipulated by a user to move the handle 62 from the locked first position to the unlocked second position and thereby release the drawer locking tab 18 of the cart 10. Advantageously, according to this invention power from the power source 28 is not utilized to manipulate the handle 62 from the locked position. Thereafter, the drawers 14 of the cart 10 may be freely opened and closed until the handle 62 has been moved from the unlocked second position to the locked first position. In the locked position, the handle 62 engages the cam 78 against the drawer locking tab 18 to secure the drawers 14 of the medical cart 10. If no manipulation of the handle 62 occurs during the specified time interval, the current is discontinued to the solenoid 24 by the integrated circuit 30 and the armature 26 moves back into contact with the recess 82 in the handle 62 to prevent movement of the handle 62 from the locked to the unlocked configuration.

Figure 10:
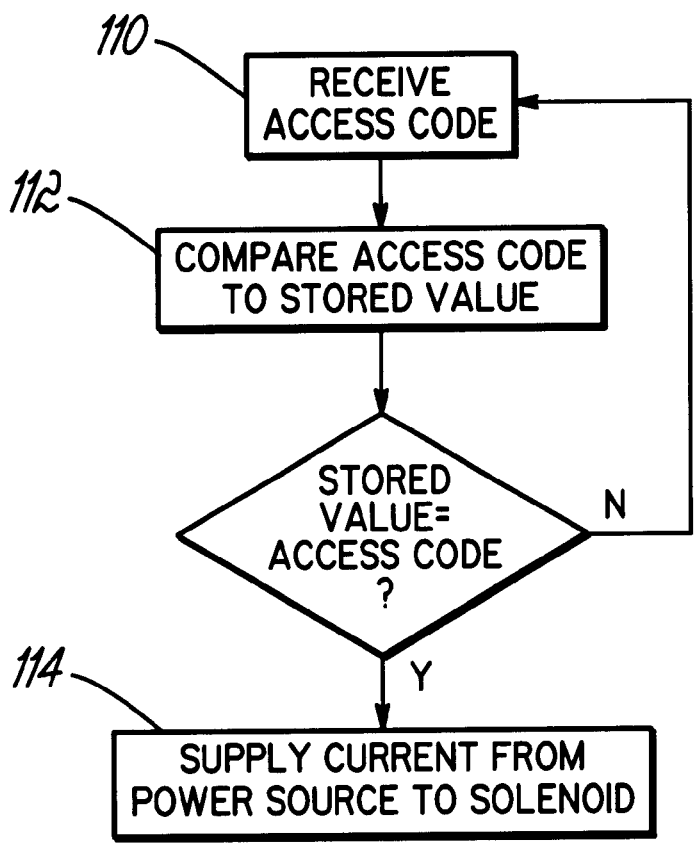
FIG. 10 is a flow chart depicting the steps of a method of securing a cart using a keyless locking system of the present invention.

FIG. 10 shows a flow chart describing the steps involved in securing the contents of a medical cart having drawers, a drawer locking tab adapted to retain the drawers, and a keyless locking system according to one preferred embodiment of the present invention. The method includes the steps of receiving an access code into an input device 110, comparing the entered access code with a stored value 112, and supplying current from a power source to a solenoid when the entered access code corresponds to the stored value 114 so that an armature of the solenoid disengages the lock mechanism to permit the handle to be manipulated and thereby disengage the locking tab of the cart.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. For example, the keyless locking system disclosed herein may be operated using a remote signaling device, instead of a keypad, to cause the integrated circuit to energize the solenoid and permit manipulation of the handle. Accordingly, departures may be made from such details without departing from the scope or spirit of applicant's general inventive concept.

What is claimed is:

1. A locking system for a cart having at least one drawer moveable between an open position and a closed position, the system comprising:
   a lock mechanism adapted to engage and disengage the drawer on the cart to selectively retain and release the drawer, the lock mechanism having a locked configuration wherein the drawer of the cart may not be opened and having an unlocked configuration wherein the drawer of the cart may be opened;
   an armature selectively engageable with the lock mechanism, the armature being engaged with the lock mechanism in the locked configuration;
   a drive mechanism coupled to the armature;
   a power supply electrically coupled to the drive mechanism to selectively energize the drive mechanism;
   an input device for receiving an input code from a user, the input device being in electrical communication with the power supply and controlling current from the power supply to the drive mechanism such that current is provided to the drive mechanism to disengage the armature from the lock mechanism when in the locked configuration; and
   an override device, the override device comprising:
      a yoke coupled to the armature,
      whereby actuation of the yoke moves the armature to disengage the lock mechanism and thereby permit the lock mechanism to be operated from the locked configuration to the unlocked configuration, and
      a key-operated lock coupled to the yoke, whereby operation of the key-operated lock actuates the yoke.

2. The locking system of claim 1 further comprising:
   a cable coupling the yoke to the key-operated lock.

3. The locking system of claim 1 wherein current is provided to the drive mechanism only when a correct code is received by the input device.

4. The locking system of claim 1 wherein current is not supplied to the drive mechanism unless the lock mechanism is to be released from the locked configuration.

5. A locking system for a cart having at least one drawer moveable between an open position and a closed position, and a drawer locking tab to selectively retain the drawer in the closed position and release the drawer for movement to the open position, the system comprising:
   a lock mechanism adapted to engage and disengage the drawer on the cart to selectively retain and release the drawer, the lock mechanism having a locked configuration wherein the drawer of the cart may not be opened and having an unlocked configuration wherein the drawer of the cart may be opened;

an armature selectively engageable with the lock mechanism, the armature being engaged with the lock mechanism in the locked configuration;

a drive mechanism coupled to the armature;

a power supply electrically coupled to the drive mechanism to selectively energize the drive mechanism; and an input device for receiving an input code from a user, the input device being in electrical communication with the power supply and controlling current from the power supply to the drive mechanism such that current is provided to the drive mechanism to disengage the armature from the lock mechanism when in the locked configuration;

the lock mechanism further comprising:

a cam to engage and disengage the locking tab of the cart to selectively retain and release the drawer, respectively, and a handle having a first position corresponding to the locked configuration of the lock mechanism and a second position corresponding to the unlocked configuration of the lock mechanism, wherein the handle is coupled to the cam and rotatably and slidably mounted to the lock mechanism, and whereby the cam is movable to disengage the locking tab of the cart when the handle is moved from the first position to the second position by rotating and sliding the handle.

6. The locking system of claim 5 wherein the lock mechanism further comprises;

a spring coupled to the handle to bias the handle toward the second position.

7. The locking system of claim 5 wherein the lock mechanism further comprises;

a spring coupled to the handle to both bias the handle rotationally toward the first position and axially toward the second position.

8. A locking system for a cart having at least one drawer moveable between an open position and a closed position, and a drawer locking tab to selectively retain the drawer in the closed position and release the drawer for movement to the open position, the system comprising:

a lock mechanism adapted to engage and disengage the drawer locking tab to selectively retain and release the drawer, the lock mechanism having a locked configuration wherein the drawer of the cart may not be opened and having an unlocked configuration wherein the drawer of the cart may be opened;

an armature selectively engageable with the lock mechanism, the armature being engaged with the lock mechanism in the locked configuration;

a drive mechanism coupled to the armature;

a power supply electrically coupled to the drive mechanism to selectively energize the drive mechanism; and an input device for receiving an input code from a user, the input device being in electrical communication with the power supply and controlling current from the power supply to the drive mechanism such that current is provided to the drive mechanism to disengage the armature from the lock mechanism when in the locked configuration;

the lock mechanism further comprising:

a housing having opposing first and second apertures each in communication with a central cavity, an elongated rod having a first end and a second end, the second end of the rod extending though the first aperture of the housing and into the cavity, the first end of the rod protruding from the housing, a cam surface on the first end of the rod engaging the drawer locking tab to retain the drawer in the closed position when the cam surface is moved in a direction away from the housing, and to disengage the drawer locking tab to release the drawer when the cam surface is moved in a direction toward the housing, a handle having a first end and a second end, the first end of the handle having a knob adapted to be grasped by the user, the second end of the handle extending into the cavity of the housing through the second aperture and being coupled to the second end of the rod, the handle being slidably and rotatably coupled to the housing whereby the cam surface of the rod is movable in a direction away from the housing to engage the drawer locking tab by sliding and rotating the handle to a first position, and the cam surface is movable in a direction toward the housing to disengage the drawer locking tab by rotating and sliding the handle to a second position, and a coil spring disposed within the central cavity and coupled to the handle to bias the handle toward the second position.

9. The locking system of claim 8 wherein the coil spring biases the handle in a rotational direction toward the first position and in an axial direction toward the second position.

10. The locking system of claim 9 wherein the lock mechanism further comprises:

a boss extending from the handle within the housing;

a groove formed into the interior cavity of the housing proximate the second aperture; and wherein the boss and the groove mate together to preload the spring axially and rotationally upon initial assembly of the lock mechanism.

11. The locking system of claim 10 wherein the housing further comprises:

a slot operatively engaging the boss on the handle, the slot being shaped to control motion of the handle between the first and second positions by limiting the motion of the boss within the slot.

12. The locking system of claim 11 wherein the housing further comprises:

a tab proximate the slot and in communication with the groove, the tab being configured to engage the boss on the handle such that the boss may pass from the groove to the slot upon initial assembly of the lock mechanism to preload the spring.

13. The locking system of claim 12 wherein the boss is prevented from reentering the groove after initial assembly of the lock mechanism.

14. A locking system for a cart having a drawer locking tab and at least one drawer moveable between an open position and a closed position, the system comprising:

a lock mechanism including a housing having opposing first and second apertures each in communication with a central cavity, the lock mechanism having a locked configuration wherein the drawer of the cart may not be opened and having an unlocked configuration wherein the drawer of the cart may be opened;

an elongated rod having a first end and a second end, the second end of the rod extending though the first aperture of the housing and into the cavity, the first end of the rod protruding from the housing;

a cam surface on the first end of the rod engaging the drawer locking tab to retain the drawer in the closed position when the cam surface is moved in a direction away from the housing, and to disengage the drawer locking tab to release the drawer when the cam surface is moved in a direction toward the housing;

a handle having a first end and a second end, the first end of the handle having a knob adapted to be grasped by the user, the second end of the handle extending into the cavity of the housing through the second aperture and being coupled to the second end of the rod, the handle being slidably and rotatably coupled to the housing whereby the cam surface of the rod is movable in a direction away from the housing to engage the drawer locking tab by sliding and rotating the handle to a first position, and the cam surface is movable in a direction toward the housing to disengage the drawer locking tab by rotating and sliding the handle to a second position; and a coil spring disposed within the central cavity and coupled to the handle to bias the handle in a rotational direction toward the first position and in an axial direction toward the second position;

an armature selectively engageable with the lock mechanism, the armature being engaged with the lock mechanism in the locked configuration;

a solenoid coupled to the armature;

a power supply electrically coupled to the solenoid to selectively energize the solenoid;

an input device for receiving an input code from the user, the input device being in electrical communication with the power supply and controlling current from the power supply to the solenoid such that current is provided to the solenoid to disengage the armature from the locked mechanism when in the locked configuration;

a manual override device including a yoke coupled to the armature, whereby actuation of the yoke moves the armature to disengage the lock mechanism and thereby permit the lock mechanism to be operated from the locked configuration to the unlocked configuration; and a key-operated lock coupled to the yoke, whereby operation of the key-operated lock actuates the yoke.

15. A lockable cart comprising;

a frame;

at least one drawer supported in the frame and moveable between an open position and a closed position;

a lock mechanism adapted to engage and disengage the drawer on the cart to selectively retain and release the drawer, the lock mechanism having a locked configuration wherein the drawer of the cart may not be opened and having an unlocked configuration wherein the drawer of the cart may be opened;

an armature selectively engageable with the lock mechanism, the armature being engaged with the lock mechanism in the locked configuration;

a drive mechanism coupled to the armature;

a power supply electrically coupled to the drive mechanism to selectively energize the drive mechanism;

an input device for receiving an input code from a user, the input device being in electrical communication with the power supply and controlling current from the power supply to the drive mechanism such that current is provided to the drive mechanism to disengage the armature from the locked mechanism when in the locked configuration; and a manual override device, the override device comprising:
   a yoke coupled to the armature,
      whereby actuation of the yoke moves the armature to disengage the lock mechanism and thereby permit the lock mechanism to be operated from the locked configuration to the unlocked configuration, and
   a key-operated lock coupled to the yoke, whereby operation of the key-operated lock actuates the yoke.

16. The cart of claim 15 wherein the override device further comprises:

a cable coupling the yoke to the key-operated lock.

17. The cart of claim 15 further comprising:

a drawer locking tab to selectively retain the drawer in the closed position and to release the drawer for movement to the open position; and wherein said lock mechanism is adapted to engage and disengage said drawer locking tab.

18. A lockable cart comprising:

a frame;

at least one drawer supported in the frame and moveable between an open position and a closed position;

a lock mechanism adapted to engage and disengage the drawer on the cart to selectively retain and release the drawer, the lock mechanism having a locked configuration wherein the drawer of the cart may not be opened and having an unlocked configuration wherein the drawer of the cart may be opened;

an armature selectively engageable with the lock mechanism, the armature being engaged with the lock mechanism in the locked configuration;

a drive mechanism coupled to the armature;

a power supply electrically coupled to the drive mechanism to selectively energize the drive mechanism;

an input device for receiving an input code from a user, the input device being in electrical communication with the power supply and controlling current from the power supply to the drive mechanism such that current is provided to the drive mechanism to disengage the armature from the locked mechanism when in the locked configuration; and a drawer locking tab to selectively retain the drawer in the closed position and to release the drawer for movement to the open position;

wherein said lock mechanism is adapted to engage and disengage said drawer locking tab;

the lock mechanism further comprising:
   a cam to engage and disengage the locking tab of the cart to selectively retain and release the drawer, respectively,
   a handle having a first position corresponding to the locked configuration of the lock mechanism and a second position corresponding to the unlocked configuration of the lock mechanism,
   wherein the handle is coupled to the cam and rotatably and slidably mounted to the lock mechanism, and
   whereby the cam is movable to disengage the locking tab of the cart when the handle is moved from the first position to the second position by rotating and sliding the handle.

19. The cart of claim 18 wherein the lock mechanism further comprises;

a spring coupled to the handle to bias the handle toward the second position.

20. The cart of claim 18 wherein the lock mechanism further comprises;

a spring coupled to the handle to both bias the handle rotationally toward the first position and axially toward the second position.

21. A lockable cart comprising:

a frame;

at least one drawer supported in the frame and moveable between an open position and a closed position;

a lock mechanism adapted to engage and disengage the drawer on the cart to selectively retain and release the drawer, the lock mechanism having a locked configuration wherein the drawer of the cart may not be opened and having an unlocked configuration wherein the drawer of the cart may be opened;

an armature selectively engageable with the lock mechanism, the armature being engaged with the lock mechanism in the locked configuration;

a drive mechanism coupled to the armature;

a power supply electrically coupled to the drive mechanism to selectively energize the drive mechanism;

an input device for receiving an input code from a user, the input device being in electrical communication with the power supply and controlling current from the power supply to the drive mechanism such that current is provided to the drive mechanism to disengage the armature from the locked mechanism when in the locked configuration; and a drawer locking tab to selectively retain the drawer in the closed position and to release the drawer for movement to the open position, wherein said lock mechanism is adapted to engage and disengage said drawer locking tab;

the lock mechanism further comprising:

a housing having opposing first and second apertures each in communication with a central cavity, an elongated rod having a first end and a second end, the second end of the rod extending though the first aperture of the housing and into the cavity, the first end of the rod protruding from the housing, a cam surface on the first end of the rod engaging the drawer locking tab to retain the drawers in the closed position when the cam surface is moved in a direction away from the housing, and to disengage the drawer locking tab to release the drawers when the cam surface is moved in a direction toward the housing, a handle having a first end and a second end, the first end of the handle having a knob adapted to be grasped by the user, the second end of the handle extending into the cavity of the housing through the second aperture and being coupled to the second end of the rod, the handle being slidably and rotatably coupled to the housing whereby the cam surface of the rod is movable in a direction away from the housing to engage the drawer locking tab by sliding and rotating the handle to a first position, and the cam surface is movable in a direction toward the housing to disengage the drawer rocking tab by rotating and sliding the handle to a second position, and a coil spring disposed within the central cavity and coupled to the handle to bias the handle toward the second position.

22. The cart of claim 21 wherein the coil spring biases the handle in a rotational direction toward the first position and in an axial direction toward the second position.

23. The cart of claim 22 wherein the lock mechanism further comprises:

a boss extending from the handle within the housing;

a groove formed into the interior cavity of the housing proximate the second aperture; and wherein the boss and the groove mate together to preload the spring axially and rotationally upon initial assembly of the lock mechanism.

24. The cart of claim 23 wherein the housing further comprises:

a slot operatively engaging the boss an the handle, the slot being shaped to control motion of the handle between the first and second positions by limiting the motion of the boss within the slot.

25. The cart of claim 24 wherein the housing further comprises:

a tab proximate the slot and in communication with the groove, the tab being configured to engage the boss on the handle such that the boss may pass from the groove to the slot upon initial assembly of the lock mechanism to preload the spring.

26. The cart of claim 25 wherein the boss is prevented from reentering the groove after initial assembly of the lock mechanism.

27. The cart of claim 26 further comprising casters disposed on the cart to facilitate movement of the cart.

* * * * *